United States Patent [19]
Brink

[11] Patent Number: 5,893,271
[45] Date of Patent: Apr. 13, 1999

[54] VAPOR DEGREASER REFRIGERATION SYSTEM

[75] Inventor: Christopher J. Brink, Bowling Green, Ky.

[73] Assignee: Detrex Corporation, Bowling Green, Ky.

[21] Appl. No.: 08/903,138

[22] Filed: Jul. 30, 1997

[51] Int. Cl.⁶ .................................................. F25D 17/06
[52] U.S. Cl. .............................. 62/93; 62/199; 62/196.4; 202/160
[58] Field of Search ...................... 62/196.4, 197, 62/199, 200, 225, 504, 324.3, 93; 202/160, 173, 186

[56] References Cited

U.S. PATENT DOCUMENTS

| | | | |
|---|---|---|---|
| 2,718,120 | 9/1955 | Wiley | 62/151 |
| 3,722,230 | 3/1973 | Scott et al. | 62/200 |
| 3,734,810 | 5/1973 | Davis | 62/196.4 X |
| 4,003,798 | 1/1977 | McCord | 62/199 X |
| 4,014,751 | 3/1977 | McCord | 62/199 X |
| 4,556,456 | 12/1985 | Ruckriegel et al. | 202/186 |
| 4,615,768 | 10/1986 | McCord | 202/186 X |
| 4,644,756 | 2/1987 | Sugimoto et al. | 62/200 X |
| 4,766,735 | 8/1988 | Gotou | 62/199 X |

Primary Examiner—Henry Bennett
Assistant Examiner—Susanne C. Tinker
Attorney, Agent, or Firm—Harness, Dickey & Pierce, P.L.C.

[57] ABSTRACT

A cooling system with super heating control for a vapor degreasing apparatus is provided. The cooling system consists of a single condenser receiving a substantially gaseous refrigerant and producing a substantially liquid refrigerant. A first chilling coil evaporates at least a portion of the substantially liquid refrigerant which results in heat absorption by the first chilling coil at a first absorption rate. A second chilling coil evaporates at least a portion of the substantially liquid refrigerant resulting in heat absorption by the second chilling coil at a second absorption rate, and a desuperheating system, connected to the first and second chilling coils and the condenser, controlling the temperature of the substantially gaseous refrigerant generated by the first and second chilling coils and received by the condenser.

15 Claims, 3 Drawing Sheets

VAPOR DEGREASER REFRIGERATION SYSTEM

BACKGROUND OF THE INVENTION

1. Field of the Invention

The present invention is directed to vapor degreasing systems, and is more particularly directed to a cooling apparatus and methodology for use in a vapor degreaser which utilizes multiple chilling coils.

2. Description of the Related Art

Organic solvents/cleaning agents are used in various types of vapor degreasing/defluxing equipment to clean articles of manufacture, deflux electronic circuit boards, and the like. The organic solvents generally used are volatile organic solvents and fluorinated compounds using CFCs.

CFCs have been recognized to contribute to the depletion of the stratospheric ozone layer and to contribute to the global warming phenomena. In view of these damaging effects to the environment, the ozone-depleting solvents were replaced with hydrochlorofluorocarbons (HCFCs) and hydrofluorocarbons (HFCs). The HCFC and HFC alternatives are generally more expensive and more physiologically active. Therefore, the traditional incentives to reduce vapor losses because of cost and safety were enhanced with the adoption of the HFC or HCFC solvents. Furthermore, with the use of these new cleaning agents, new parameters were required for various regions in the upper portion of degreaser tanks.

In view of the foregoing concerns, methods were developed in order to reduce vapor losses to the atmosphere and provide the tank conditions necessary for proper operation. This included the use of multiple cooling coil or heat exchanger configurations, also using non-CFC refrigerants.

In a multiple evaporator cooling configuration, the evaporators must operate at different temperatures. Currently, this is accomplished by providing each evaporator with its own condensing unit. However, this increases the number of cooling system components, thereby driving up the overall cost of the degreasing apparatus. In addition, the increase in the number of components results in an apparatus that is bulky and cumbersome and also impedes efforts to reduce degreaser sizes.

Therefore, it is one object of the present invention to provide a cooling system with multiple evaporators for cooling various zones of the degreaser tank at different temperatures without using a dedicated condensing unit for each heat exchanger. Additional advantages and features of the present invention will become apparent from the subsequent description and appended claims, taken in conjunction with the accompanying drawings.

SUMMARY OF THE INVENTION

In accordance with the teachings of the present invention, a cooling system with desuperheating control for a vapor degreasing apparatus is provided. The system has a single condenser receiving a substantially gaseous refrigerant and producing a substantially liquid refrigerant. A first chilling coil evaporates a first portion of the substantially liquid refrigerant which results in heat absorption by the first chilling coil at a first absorption rate. A second chilling coil evaporates a second portion of the substantially liquid refrigerant resulting in heat absorption by the second chilling coil at a second absorption rate, and a desuperheating system connected to the first and second chilling coils and the condenser that controls the temperature of the substantially gaseous refrigerant generated by the first and second chilling coils and received by the condenser.

BRIEF DESCRIPTION OF THE DRAWINGS

Other objects and advantages of the invention will become apparent upon reading the following detailed description and upon reference to the following drawings, in which.

DESCRIPTION OF THE PREFERRED EMBODIMENT

The following description of the preferred embodiment is mainly exemplary in nature and is in no way intended to limit the invention or its application or uses.

Figure 1:
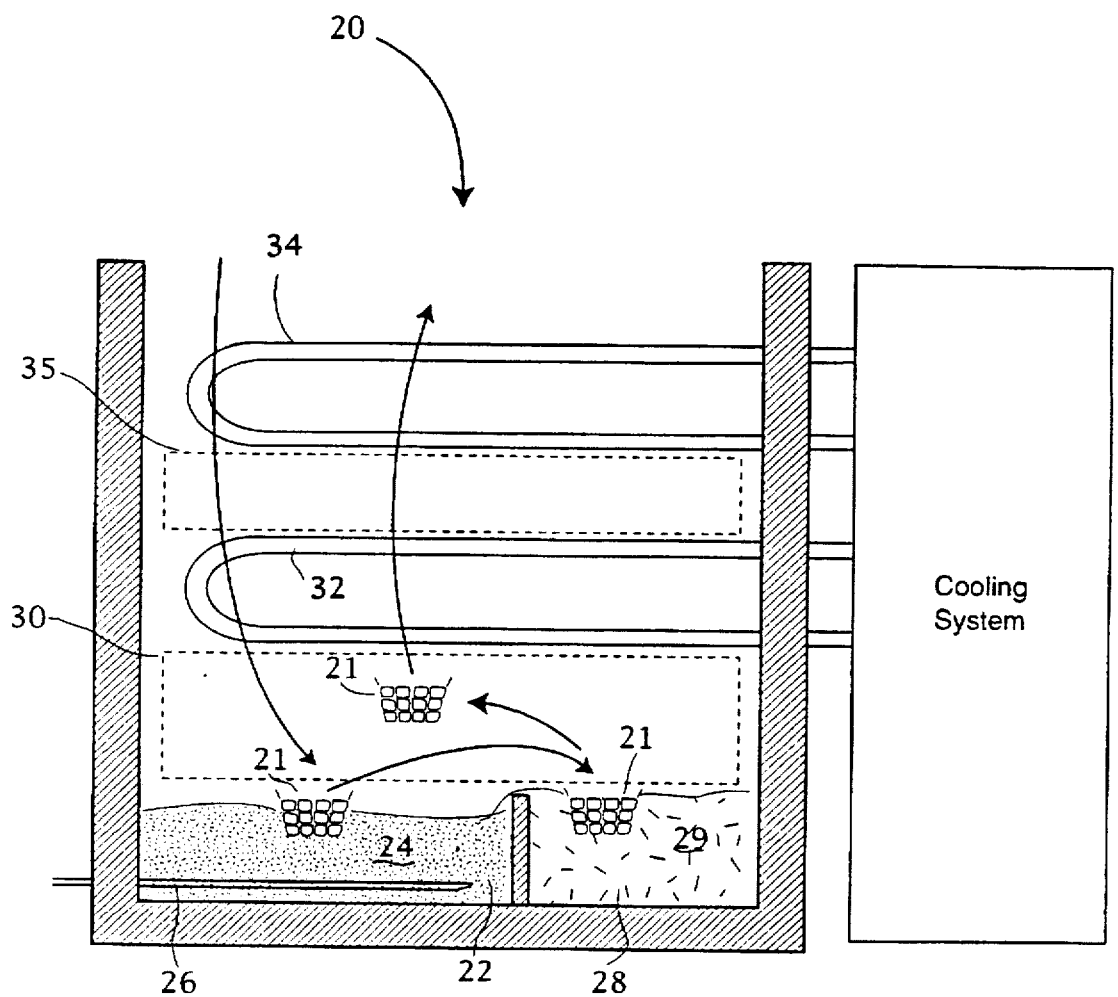
FIG. 1 is a cross-sectional view of a vapor degreasing apparatus incorporating a dual chilling coil cooling system constructed in accordance with the teachings of the prior art.

FIG. 1 shows a dual chilling coil vapor degreasing apparatus 20 of the prior art. In a known manner, articles that are to be cleaned are placed in a basket 21 and lowered into a hot tank 22 of the degreasing apparatus 20. The hot tank 22 contains a boiling solvent 24 which has been heated by a heating coil 26. The immersion of the article in the boiling solvent 24 removes by agitation and solvent power most of the grease, chips, dirt, etc., that is attached to the article.

After the article has been bathed in the hot tank 22, the basket 21 is transferred to an immersion chamber 28 containing solvent 29 of a slightly cooler temperature, thereby providing further dissolution of any grease. Furthermore, the bath in the immersion chamber 28 cools the article below the boiling point of the solvent. Therefore, the immersion chamber 28 provides an additional rinsing step in a solution with a lower concentration of grease than is present in the hot tank solvent 24.

After a time in the immersion chamber 28, the basket 21 is removed and hung in a solvent vapor zone 30 established by a first cooling coil 32. While the basket is in the solvent vapor zone 30, vapor condenses on the cold parts contained in the basket 21 and drips from the hanging articles, removing any remaining soluble contaminants. After the hanging articles have been cooled below boiling temperature of the solvent, this washing action in the vapor zone 30 ceases, and the article is in a cleaned condition and ready for removal from the degreaser 20.

As the basket 21 is moved above the solvent vapor zone 30, additional solvent and/or vapor is condensed to minimize the amount of solvent or solvent vapor that is carried out of the tank and also reduce emissive losses during idle modes. This is accomplished by creating a condensing zone 35 with a second cooling coil 34 (or freeboard chiller coil), maintained at a temperature which is below the temperature of the first cooling coil 32.

Figure 2:
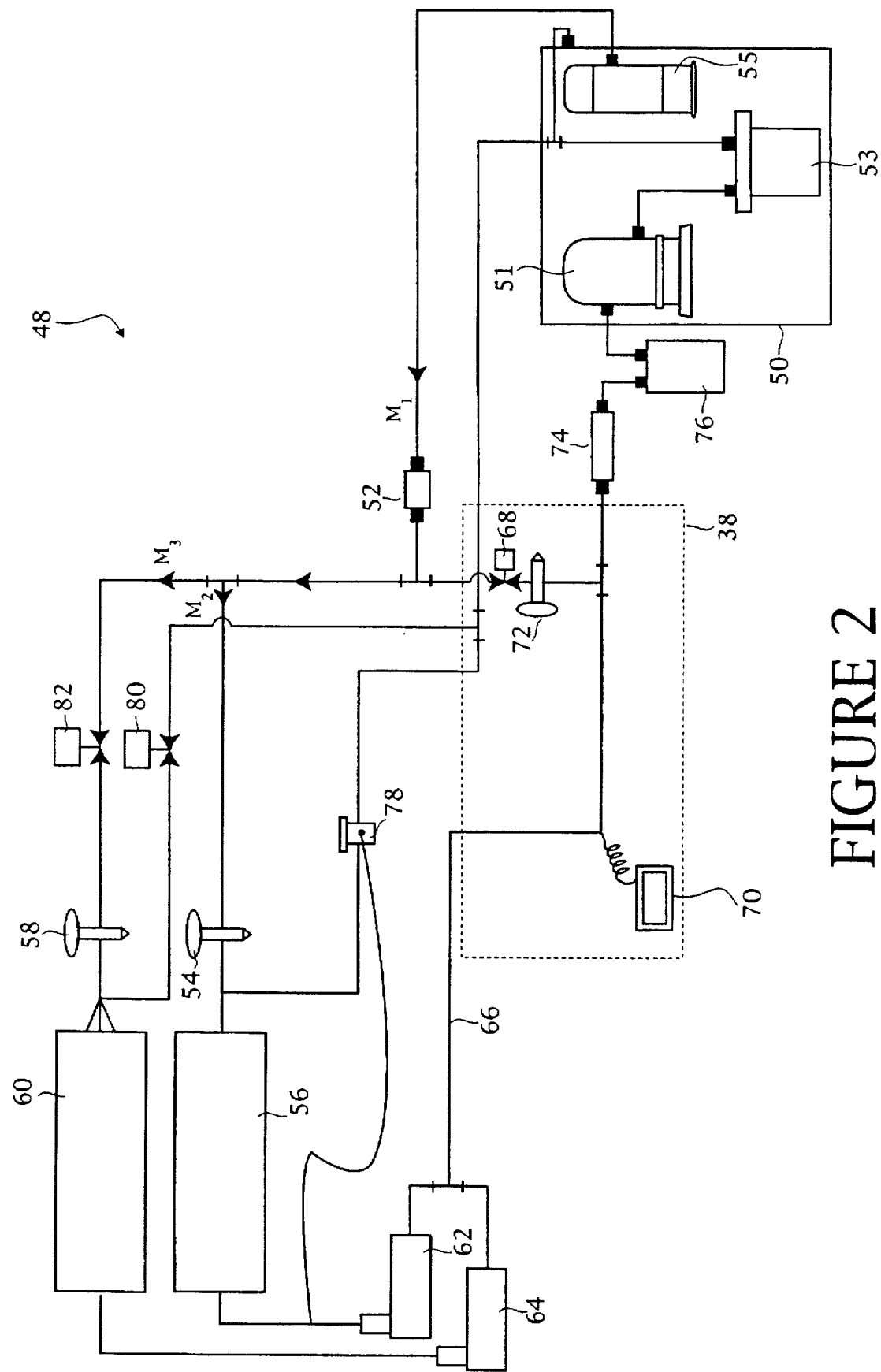
FIG. 2 is a schematic view illustrating the cooling system of the preferred embodiment of the present invention.
Figure 3:
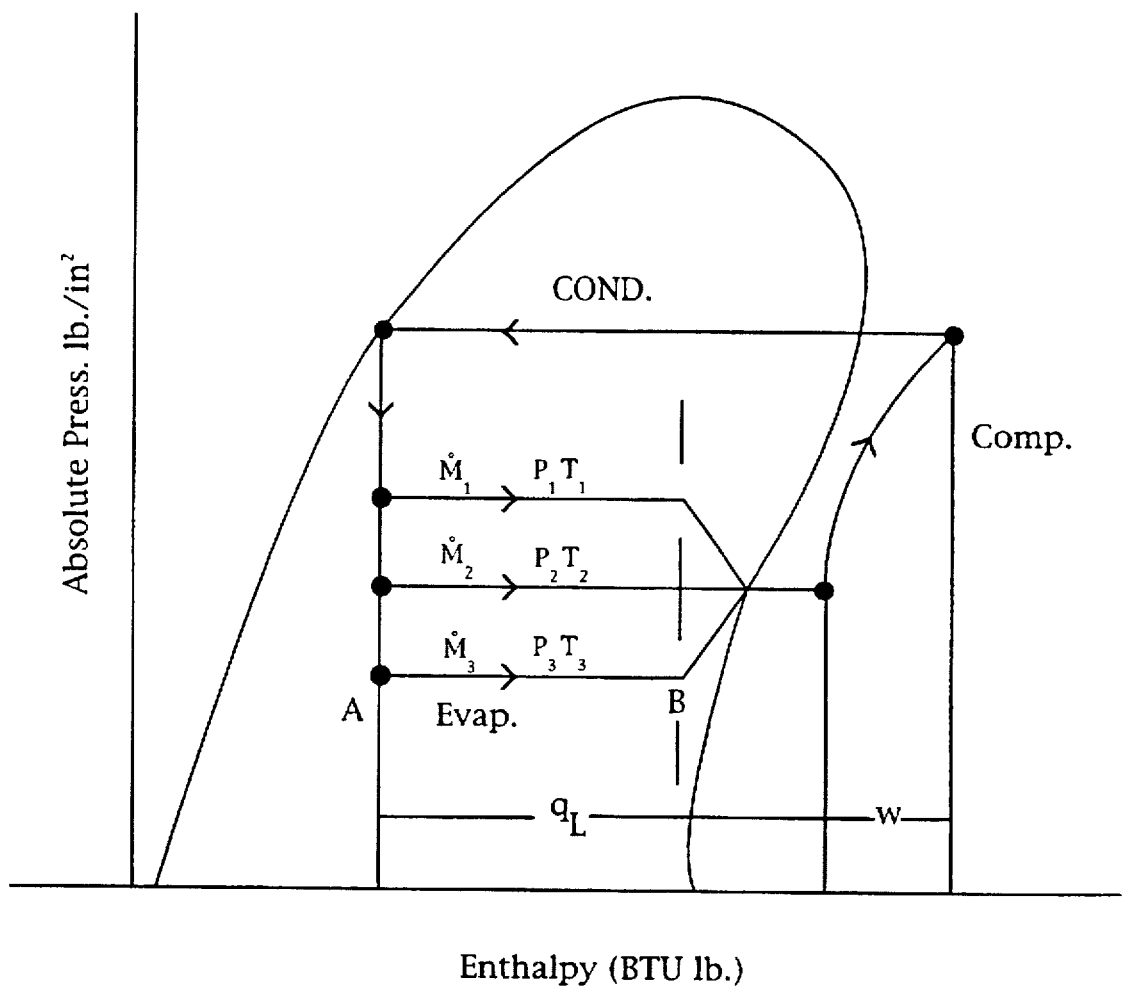
FIG. 3 is a graph of absolute pressure versus enthalpy demonstrating the theoretical refrigeration cycle for the preferred embodiment of the present invention.

Prior to the present invention, the multiple cooling coil configurations, such as that shown in FIG. 1, required two different condensing units. While effective, a two condensing unit cooling system is costly, cumbersome, bulky, and limits reduction in vapor degreaser size. Therefore, the preferred embodiment of the present invention provides a refrigeration system which runs a first cooling coil and second cooling coil at a minimum of two different temperatures using a single condensing unit. Turning now to FIGS. 2 and 3, the single condenser-multiple evaporator cooling system (SCME) 48 constructed in accordance with the teachings of the present invention will be described. FIG. 2 is a schematic view of the SCME 48. The theoretical cooling cycle is provided in the absolute pressure versus enthalpy graph of FIG. 3.

The SCME system 48 overcomes the need for more than one condensing unit by separating the supply mass flow rate into subparts and metering these subparts through the individual evaporators as needed. The pressure temperature relationship that exists with all gases allows each evaporator temperature to be individually set as required. Specifically, the refrigerant supply to each evaporator is represented by the following relationship:

$$q = m(h_1 - h_2) \quad (1)$$

where q is the load (Btu/min.), m is the mass flow (lbs/min.), and $(h_1-h_2)$ is the change in enthalpy (Btu/lb.). Based upon the relationship of equation 1, the supply mass flow at a given evaporator temperature may be determined by solving equation 1 for the mass flow, with a result of:

$$m = q/(h_1 - h_2) \quad (2)$$

In view of this relationship, it can be seen that a single condenser may be used to run two chilling coils at different temperatures by metering the appropriate amount of refrigerant through the evaporator at the present pressure drop as set by an evaporator pressure regulator (EPR) valve. Referring to FIG. 2, the SCME 48 is shown to include a single condensing unit 50 having a compressor 51, a receiver tank 53 and a condenser 55. The single condensing unit 50 supplies liquified refrigerant at a first mass flow rate (ml). This liquified refrigerant flow is initially filtered and dried with a desiccant core type filter dryer 52. After the flow has been filtered and dried, the liquified refrigerant flow is divided. A first portion of the flow is provided to two evaporators (56, 60) and a second portion is fed to a desuperheating system 38 which will be subsequently described. The portion of the flow which is provided to the evaporators (56, 60) is divided again with the first divided flow (m2) provided to a throttling device 54 of the first evaporator 56 and a second divided flow (m3) provided to a throttling device 58 of the second evaporator 60.

Downstream of the throttling devices (54, 58), a first pressure regulator 62 and second pressure regulator 64 are used to control the pressure/temperature relationship of each evaporator (56, 60), respectively. By varying the valve size of both the throttling devices (54, 58) and the pressure regulators (62, 64), the enthalpy change within each evaporator (56, 60) may be altered thereby providing the ability to maintain the two evaporators (56, 60) at two distinct temperatures.

From the first pressure regulator 62 and second pressure regulator 64, the refrigerant, in a gas form, is combined and fed through the return line 66. As suction pressure and temperature change in the return line 66, super heating is kept under control by the desuperheating system 38. The desuperheating system 38 will bleed much cooler liquified refrigerant into the return line 66 should the suction gas become too hot. The suction gas temperature is monitored by a thermostat 70 which is attached to the return line 66. The thermostat 70 opens flow of refrigerant to a desuperheating valve 68 when a specified set point is reached. This allows a super heating throttling device 72 to bleed the cooler refrigerant, as provided by the condensing unit 50 and feed through the filter dryer 52. All converging liquids are then filtered by a return filter 74 prior to entering a suction accumulator 76.

Low load conditions that can cause excessively low suction pressure are held in balance by a discharge gas bypass valve 78. This valve 78 monitors the first evaporator 56 (high temperature evaporator), which is maintained at a temperature higher than the second evaporator 60 (low temperature evaporator), thereby ensuring that the suction temperature/pressure relationship does not offset the flow of refrigerant to the overall system. The second evaporator 60 (low temperature) is not fed discharged gas. Balanced ported throttling devices are used to compensate for the less drastic varying loads, and balance ported thermostatic expansion valves are ideally suited for small capacity (i.e., <3 tons) refrigeration applications which operate over widely varying operating conditions.

In the preferred embodiment, the second evaporator 60 is defrosted to optimize performance as a freeboard cooling device and moisture collecting device. The defrosting is performed by supplying discharged gas to a distribution device 80 prior to the evaporator. Initially, the distribution device 80 opens for a fixed amount of time based upon a timer input. This supply of discharge gas for a predetermined amount of time sheds the ice from the second evaporator 60 (low temperature). In order to increase the rate of defrosting, a second distribution device 82 closes while the first distribution device 80 is open, terminating flow of liquid refrigerant.

From the foregoing, it can be seen that a cooling system with multiple evaporators operating at different temperatures may be provided for cooling various zones of a vapor degreaser without using a dedicated condenser for each exchanger.

Those skilled in the art can now appreciate from this description that the broad teachings of the present invention can be implemented in a variety of forms. Therefore, the true scope of the invention is vast, and other modifications will become apparent to the skilled practitioner upon a study of the drawings, specification, and following claims.

What is claimed is:

1. A vapor degreasing apparatus comprising:

a tank having a solvent, a solvent vapor zone and a condensing zone;

a single condenser receiving a substantially gaseous refrigerant and producing a substantially liquid refrigerant;

a first chilling coil disposed between said solvent vapor zone and said condensing zone, said first chilling coil connected to said single condenser and evaporating at least a first portion of said substantially liquid refrigerant, said refrigerant experiencing a first pressure drop as it passes through said first chilling coil;

a second chilling coil located above said condensing zone, said second chilling coil connected to said single condenser and evaporating at least a second portion of said substantially liquid refrigerant, said refrigerant experiencing a second pressure drop as it passes through said first chilling coil;

a regulator coupled to at least one of the coils for maintaining said first pressure drop at a different level than said second pressure drop so that the temperature in said condensing zone is maintained at a lower temperature than the temperature in said solvent vapor zone while using only a single condenser.

2. The vapor degreasing apparatus of claim 1 further comprising a desuperheating system connected to said condenser and said first and second chilling coils, said desuperheating system controlling a temperature of a substantially gaseous refrigerant generated by said first and second chilling coils and received by said single condenser wherein control of said refrigerant temperature is achieved without changing the temperature in said condensing zone or the temperate in said solvent vapor zone.

3. The vapor degreasing apparatus of claim 2 wherein said desuperheating system includes:

a valve disposed between said substantially liquid refrigerant and said substantially gaseous refrigerant;

a thermostat for monitoring the temperature of said substantially gaseous refrigerant and causing said valve to actuate when said substantially gaseous refrigerant exceeds a predetermined temperature; and a throttling device coupled to said valve and receiving said substantially liquid refrigerant when said valve is actuated, said throttling device causing refrigerant received from said valve to mix with said substantially gaseous refrigerant so as to provide said condenser with a return flow of refrigerant having a controlled temperature.

4. The vapor degreasing apparatus of claim 1 further including a defrosting circuit having first and second valves, said first valve for terminating a supply of refrigerant to a throttling device at an inlet side of said second chilling coil and said second valve for enabling a supply of substantially gaseous discharge refrigerant to said second chilling coil.

5. The vapor degreasing apparatus of claim 1 further comprising a discharge gas bypass valve coupled to said first chilling coil, said valve for enabling a supply of substantially gaseous discharge refrigerant to said first chilling coil when a suction pressure from an outlet side of said first chilling coil declines below a predetermined pressure level.

6. The vapor degreasing apparatus of claim 1 further comprising a balanced ported throttling device coupled to at least one of said first and second chilling coils.

7. The vapor degreasing apparatus of claim 6 wherein said balanced ported throttling device is a balance ported thermostatic expansion valve.

8. A method for operating a vapor degreasing apparatus, comprising the steps of:

heating a tank containing a solvent;

producing a solvent vapor;

condensing a substantially gaseous refrigerant with a single condenser to produce a substantially liquid refrigerant;

providing a first portion of said substantially liquid refrigerant from said single condenser to a first chilling coil;

providing a second portion of said substantially liquid refrigerant from said single condenser to a second chilling coil;

regulating a pressure drop across at least one of said first and second chilling coils to maintain said chilling coils at a first and second temperature, respectively, said first chilling coil thereby creating a solvent vapor zone located proximate said tank and said second chilling coil creating a condensing zone located above said solvent vapor zone.

9. The method of claim 8, further comprising the steps of:

monitoring said temperature of said substantially gaseous refrigerant exiting said first and second chilling coils;

supplying substantially liquid refrigerant to a throttling device when said temperature of said substantially gaseous refrigerant exceeds a predetermined value; and mixing said substantially gaseous refrigerant said refrigerant from said throttling device to provide desuperheating control.

10. The method of claim 8, further comprising the step of defrosting said second chilling coil.

11. The method of claim 10, wherein said defrosting step includes the steps of:

terminating a supply of refrigerant to a throttling device at an inlet side of said second chilling coil; and enabling a supply of substantially gaseous discharge refrigerant to said second chilling coil.

12. The method of claim 8, further comprising the steps of:

monitoring a suction pressure from an outlet side of said first chilling coil; and enabling a supply of substantially gaseous discharge refrigerant to said first chilling coil when said suction pressure declines below a predetermined pressure level.

13. A cooling system with super heating control for a vapor degreasing apparatus, comprising:

a single condenser receiving a substantially gaseous refrigerant and producing a substantially liquid refrigerant;

a first chilling coil connected to the single condenser for evaporating at least a first portion of the substantially liquid refrigerant which results in heat absorption by the first chilling coil at a first absorption rate;

a second chilling coil connected to the single condenser for evaporating at least a second portion of the substantially liquid refrigerant resulting in heat absorption by the second chilling coil at a second absorption rate; and a desuperheating system connected to the first and second chilling coils and the condenser, the desuperheating system controlling the temperature of the substantially gaseous refrigerant generated by the first and second chilling coils and received by the condenser, said desuperheating system including a thermostat that monitors a temperature of the substantially gaseous refrigerant that is generated by the first and second chilling coils;

a valve that receives the substantially liquid refrigerant from the single condenser and opens when the thermostat indicates the temperature of the substantially gaseous refrigerant generated by the first and second chilling coils meets a predetermined temperature condition; and a throttling device that receives the substantially liquid refrigerant when the valve is open, the throttling device mixing the substantially liquid refrigerant with the substantially gaseous refrigerant generated by the first and second chilling coils such that the temperature of the substantially gaseous refrigerant generated by the first and second coils is controlled.

14. A cooling method with desuperheating control for a vapor degreasing apparatus, comprising the steps of:

condensing a substantially gaseous refrigerant with a singe condenser to produce a substantially liquid refrigerant;

evaporating a first portion of the substantially liquid refrigerant with a first chilling coil which provides heat absorption at a first absorption rate;

evaporating a second portion of the substantially liquid refrigerant with a second chilling coil which provides heat absorption at a second absorption rate; and controlling the temperature of the substantially gaseous refrigerant generated by the first and second chilling coils and received by the condenser with a desuperheating system connected to the first and second chilling coils and the condenser, the temperature controlling step including the steps of:
monitoring the temperature of the substantially gaseous refrigerant that is generated by the first and second chilling coils;
providing the substantially liquid refrigerant from the single condenser when the temperature of the substantially gaseous refrigerant generated by the first and second coils meets a predetermined temperature condition; and
mixing the substantially liquid refrigerant with the substantially gaseous refrigerant generated by the first and second chilling coils when the predetermined temperature condition is met such that the temperature of the substantially gaseous refrigerant generated by the first and second chilling coils is controlled.

15. A multiple cooling coil vapor degreasing apparatus with a single condenser cooling system and desuperheating control, comprising:
a first tank containing a solvent;
a second tank containing a solvent that is at a temperature less than the solvent contained in the first tank;
a solvent vapor zone created by running a first chilling coil at a first temperature;
a condensing zone created by running a second chilling coil at a second temperature;

a cooling system running said first and second chilling coils, the cooling system having:
a single condenser receiving a substantially gaseous refrigerant and producing a substantially liquid refrigerant that is provided to the first and second chilling coils; and
a desuperheating system connected to the first and second chilling coils and the condenser, the desuperheating system controlling the temperature of the substantially gaseous refrigerant generated by the first and second chilling coils and received by the condenser, the desuperheating system including:
a thermostat that monitors a temperature of the substantially gaseous refrigerant that is generated by the first and second chilling coils;
a valve that receives the substantially liquefied refrigerant from the single condenser and opens when the thermostat indicates the temperature of the substantially gaseous refrigerant generated by the first and second chilling coils meets a predetermined temperature condition; and
a throttling device that receives the substantially liquid refrigerant when the valve is open, the throttling device mixing the substantially liquid refrigerant with the substantially gaseous refrigerant generated by the first and second chilling coils such that the temperature of the substantially gaseous refrigerant generated by the first and second chilling coils is controlled.

* * * * *

UNITED STATES PATENT AND TRADEMARK OFFICE
CERTIFICATE OF CORRECTION

PATENT NO. : 5,893,271
DATED : Apr. 13, 1999
INVENTOR(S) : Christopher J. Brink

It is certified that error appears in the above-identified patent and that said Letters Patent is hereby corrected as shown below:

Col. 3, line 34, "(ml)." should be -- (m1). --.

Col. 4, line 59, "first" should be -- second --.

Col. 5, line 07, "temperate" should be -- temperature --.

Col. 6, line 01, after "refrigerant" insert -- and --.

Signed and Sealed this

Thirtieth Day of January, 2001

Attest:

Q. TODD DICKINSON

*Attesting Officer*         *Director of Patents and Trademarks*